No. 752,823. PATENTED FEB. 23, 1904.
H. B. CARY.
COMBINED CALIPERS, T-SQUARE, AND SCALE.
APPLICATION FILED APR. 21, 1902.
NO MODEL.
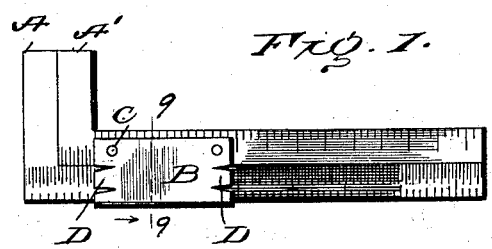
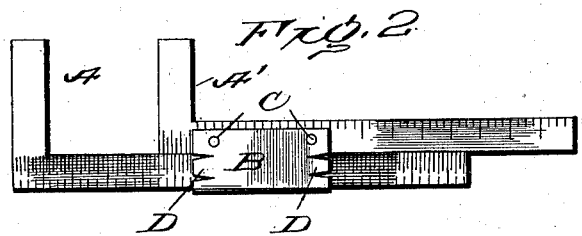
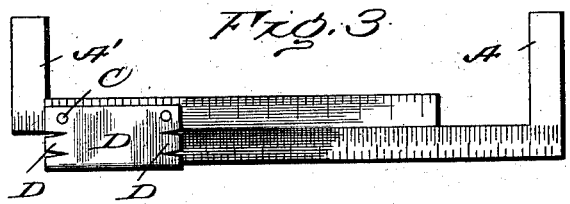
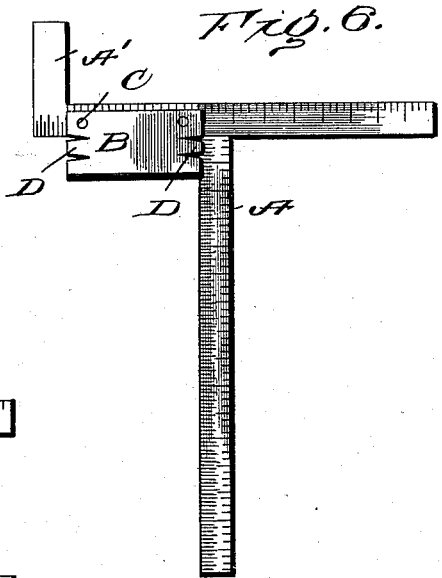
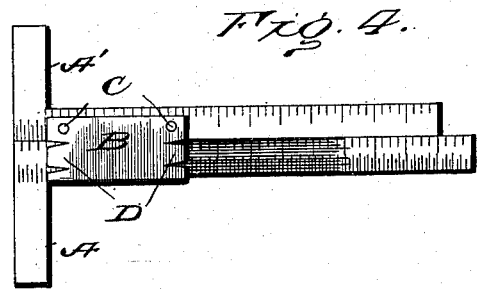
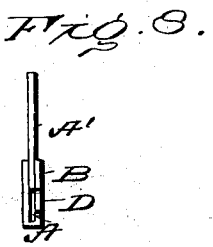
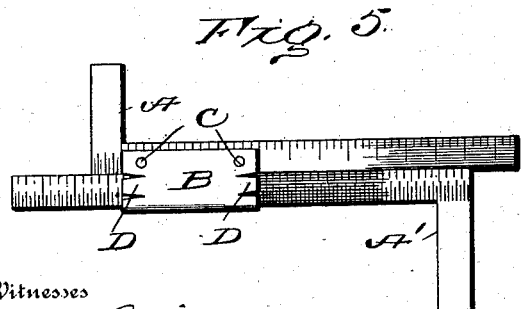
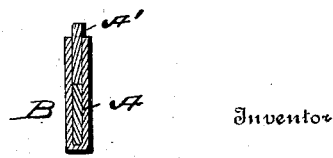
Witnesses
Inventor
Henry B. Cary
By
Attorney
THE NORRIS PETERS CO., PHOTO-LITHO., WASHINGTON, D. C.

No. 752,823. Patented February 23, 1904.

UNITED STATES PATENT OFFICE.

HENRY BOUNDS CARY, OF LOS ANGELES, CALIFORNIA.

COMBINED CALIPERS, T-SQUARE, AND SCALE.

SPECIFICATION forming part of Letters Patent No. 752,823, dated February 23, 1904.

Application filed April 21, 1902. Serial No. 104,018. (No model.)

*To all whom it may concern:*

Be it known that I, HENRY BOUNDS CARY, a citizen of the United States, residing at Los Angeles, in the county of Los Angeles and State of California, have invented certain new and useful Improvements in Combined Calipers, T-Square, and Scale; and I do hereby declare the following to be a full, clear, and exact description of the invention, such as will enable others skilled in the art to which it appertains to make and use the same.

My invention relates to certain new and useful improvements in what I denominate a "combined caliper, T-square, and scale."

My invention has for its object to provide an instrument simple and economical of construction and which may be expeditiously converted for many varied uses in making measurements and for use in drafting.

In order that its construction and capabilities may be fully understood, I will proceed to describe its construction and adaptability to conversion from one form or instrument to another, reference being had to the accompanying drawings, in which—

Figure 1 is a plan view of my improved instrument in its normal compact and initial form. Fig. 2 is a similar view showing the two members in position to constitute an ordinary caliper. Fig. 3 is a similar view showing the two members reversed and constituting a caliper of larger proportions than shown at Fig. 2. Fig. 4 is a similar view showing the two members so arranged as to constitute a T-square. Fig. 5 is a similar view showing the members so arranged as to constitute two ordinary squares reversely arranged. Fig. 6 is a similar view showing the two members so arranged as to constitute a T-square of larger proportions than that shown at Fig. 4 and with an arm parallel to and leading in an opposite direction to the leg of the T. Fig. 7 is a similar view showing the two members so arranged as to constitute an ordinary square of larger proportions than either of the squares shown at Fig. 5. Fig. 8 is an end view looking from the left of Fig. 1; and Fig. 9 is a section on increased scale, taken on the line 9 9 of Fig. 1.

Similar letters of reference indicate like parts in the several figures of the drawings.

A and A' are two L-shaped members of sheet metal, the legs or long arms of which are provided with scale-marks on one or both edges, as clearly illustrated.

B is a sheet-metal loop or keeper secured to the member A' by rivets C or by brazing or in any other suitable manner and adapted to receive either the long or short arm of the member A, as clearly indicated in the several figures of the drawings, and in such manner that the two members may be readily adjusted relatively to one another. The loop or keeper C is preferably formed on one or both of its sides or faces with spring-tongues D at each end, adapted to bear against either of the arms of the member A to produce such frictional contact therewith as to hold the two members in any predetermined or adjustable relation with one another, as indicated in the various figures of the drawings. When the two members A and A' are secured together, as shown at Fig. 1, the instrument is in its normal or most compact condition. In order to convert it for use as a caliper, the two members are adjusted, as shown at Fig. 2, to separate the short arms of the members A and A', and the interior or adjacent edges of the short arms may be caused to embrace the thing to be calipered, or if inside measurement is desired to be made the two members may be so adjusted as to cause the outside edges of the short arms to contact with the interior surface of the thing to be calipered or measured, and the relation of the inside edge of the short arm of the member A' with the scale-marks upon the long arm of the member A will in an obvious manner indicate the distance between either the interior or exterior edges of the short arms.

As shown at Fig. 2, the distance which may be measured by the separation of the short arms of the two members is limited by the distance the long arm of the member A may travel within the loop or keeper B; but this may be increased by reversing the member A, as shown at Fig. 3, so that the long arm of said member shall enter the loop or keeper B from the end opposite to that shown at Fig. 2.

When it is desired to produce a T-square, the member A is introduced within the loop or keeper B with the short arm trending in a direction opposite to the short arm of the member A' and until the inner edge of the short arm of the member A is in contact with the end of the loop or keeper B.

To produce the double reverse squares shown at Fig. 5, the long arm of the member A is inserted within the loop or keeper B from a direction opposite to that shown at Fig. 4.

When it is desired to constitute a T-square of larger proportions than shown at Fig. 4 and of the form shown at Fig. 6, the short arm of the member A is inserted from the right within the loop or keeper B, and when it is desired to produce an ordinary square of larger proportions than either one of the members A A' the short arm of the member A is inserted from the left into the loop or keeper B, as clearly shown at Fig. 7.

From the various relations and adjustments shown between the two members A and A' it will readily be seen that my improved instrument may be used for taking measurements in many ways and that it may be used with great advantage as a drafting instrument in making geometric figures of all kinds involving lines parallel and at right angles to each other and with due regard to exact distances and proportions.

As will be seen, the improved instrument is composed of only three pieces of metal, and that when the loop or keeper B is secured in position upon the member A' the instrument is then composed of two parts only. The two members A and A' being of the same geometric form may be stamped out from sheet metal with a minimum waste of material, and the loop or keeper B, being also of sheet metal, may be stamped out without waste of material and readily pressed into the form necessary to constitute a keeper or loop. The cost of production will to those familiar with the production of tools or devices from sheet metal obviously be only a slight advance upon the cost of the sheet metal, and hence the instrument may be put upon the market and furnished to the public at a very low price. While I have shown and described the loop or keeper B provided with spring or friction tongues D at both ends and on one or both sides, it will be understood that a single tongue at either end may be sufficient or that a tongue at any other locality may be used. It will also be understood that I do not wish to be limited to the use of one or more tongues at any locality, as the loop or keeper B may be so proportioned to the arms of the member A as that the necessary amount of friction between the two will be produced to secure them in any desired or adjusted relation. It will also be obvious that while I have shown and described the loop B as secured to the member A' and prefer such arrangement that said loop or keeper may be secured in a similar manner to the member A and adapted to receive the long or short arm of the member A'.

Having described the construction and arrangement of my improved instrument and its uses, what I claim as new, and desire to secure by Letters Patent, is—

In combination with the L-shaped members A, A', the loop or keeper B, secured to one of the members and adapted to receive either arm of the other member, and provided with one or more integral spring friction-tongues D, substantially as and for the purposes set forth.

In testimony whereof I affix my signature in presence of two witnesses.

HENRY BOUNDS CARY.

Witnesses:
 JNO. REDFIELD,
 ERNEST REDFIELD.